(Model.)
L. P. TOWNLEY & W. J. WASHBURN.
INSTRUMENT TO ASSIST HEARING.
No. 364,975. Patented June 14, 1887.
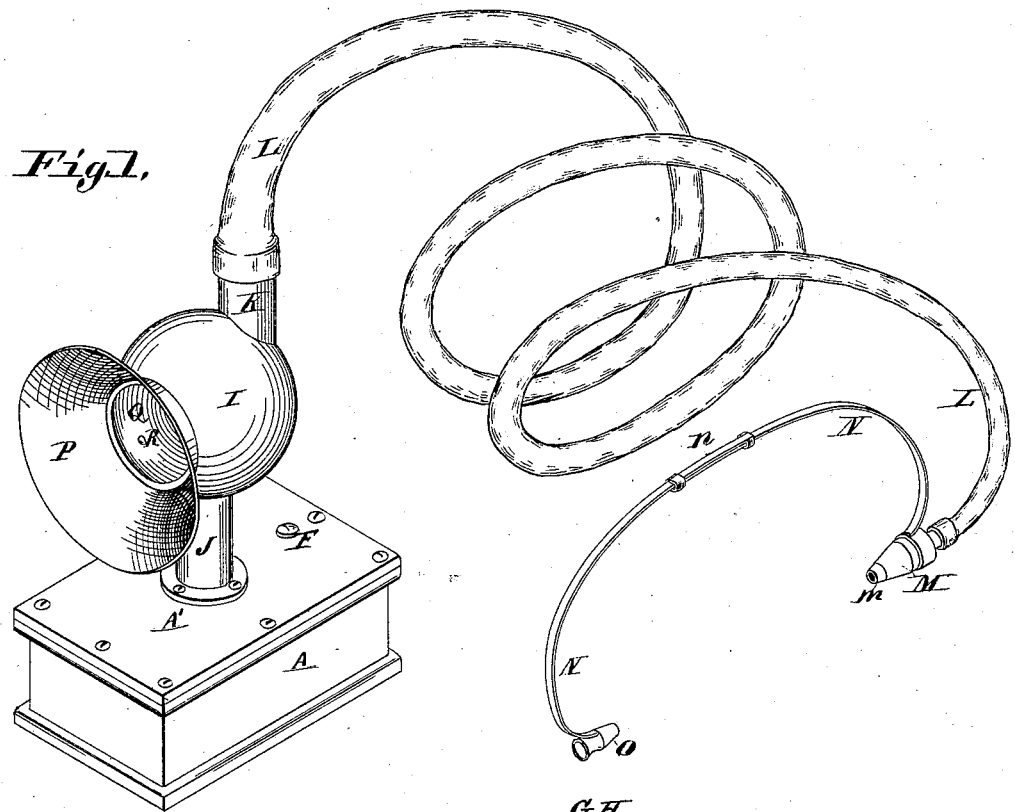
Fig. 1.
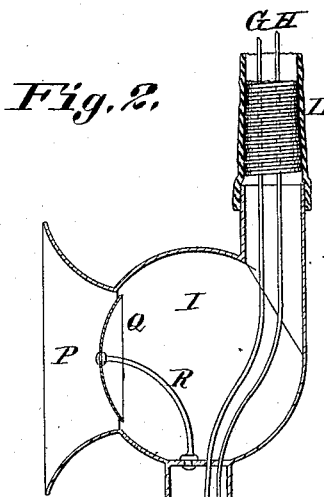
Fig. 2.
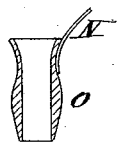
Fig. 3.
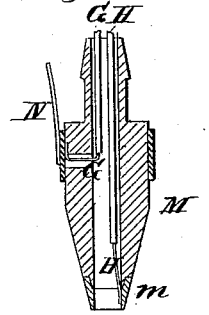
Fig. 4.
Attest:
F. A. Hopkins
L. W. Hopkins
Inventor:
Lynn P. Townley
William J. Washburn
By Knight Bros
Attys
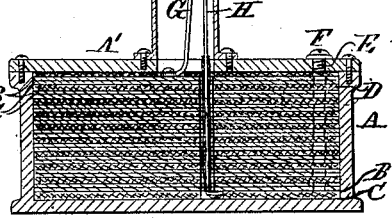

UNITED STATES PATENT OFFICE.

LYNN P. TOWNLEY AND WILLIAM J. WASHBURN, OF ST. LOUIS, MISSOURI.

INSTRUMENT TO ASSIST HEARING.

SPECIFICATION forming part of Letters Patent No. 364,975, dated June 14, 1887.

Application filed December 10, 1885. Serial No. 185,275. (Model.)

*To all whom it may concern:*

Be it known that we, LYNN P. TOWNLEY and WILLIAM J. WASHBURN, both of the city of St. Louis, in the State of Missouri, have invented a certain new and useful Improvement in Instruments to Assist Hearing, of which the following is a full, clear, and exact description, reference being had to the accompanying drawings, forming part of this specification, and in which—

Figure 1 is a perspective view of the instrument. Fig. 2 is a vertical section with the tube and ear-tips removed. Fig. 3 is an axial section of one of the ear-tips, and Fig. 4 is a similar section of the other tip.

The main novelty consists in the two ear pieces or tips connected to the opposite poles of an electric battery, so that a mild electric current shall pass from ear to ear, the electric current passing through the head of the user. Its curative properties are not fully brought out on first application, but each successive application tends to increase the sensitiveness of the ear to sound-vibrations.

There are other details of the invention, which will be hereinafter described and claimed.

A is a case containing a voltaic pile, which may consist of alternating plates of copper, B, and zinc, C, placed in pairs, with felt or other absorbent material, D, separating pair from pair. This voltaic pile may be constructed in any suitable manner, or any galvanic battery may be used in its place, the essential thing being that a current of electricity shall be produced.

The case A and its cover A' may be made of any suitable material which will retain the acid with which the absorbent material is made wet. If the case is made of material which is a non-conductor of electricity, or if it is lined with such material, the plates B C may come in contact with the case without lessening the power of the battery.

E is a hole in the cover A, stopped by a screw-plug, F. The hole is for the introduction of the acid into the case. The plates B and C, except the bottom plate or pair, are bored through vertically beneath the hole E to allow the acid to pass through them for the wetting of the felt or other absorbent material, D.

G is a conducting-wire in electric connection with the upper plate of the battery, and H is a similar wire in contact with the lower battery-plate, so that the wires constitute the negative and positive poles. The wire H is shown insulated from the liquid and other matters within the trough (except the lower plate) by a casing of gutta-percha or other material. The wires G and H are wrapped with silk or other insulating material.

I is a spherical case connected to the cover A' by a leg, J, and having a tangential or other neck, K, to which is secured the end of a flexible tube or hose, L. This tube we prefer to make larger at the end which is secured to the neck K, but do not confine ourselves to this construction. At the free end of the flexible tube L is an ear-piece, M, suited to enter the orifice of the ear. The ear-piece, or the tip $m$ of the same, is made of material that will conduct electricity, and the wire H is carried up the tube and its end is in contact with said tip. The wire G is also carried up the tube and passes through a hole in the ear-piece M, and is in electric connection with a flexible bar, N, of metal, whose other end carries another tubular or solid ear piece or tip, O, of conducting material. The bar N may or may not be made with a slip-joint or other joint at $n$, so that it may be made longer or shorter, according to circumstances. The ear-tips are in electric connection with the opposite poles of the battery, and when placed in the orifices of the ears the electric currents will pass through the head between them.

P is a funnel-shaped mouth-piece, whose inner end forms the side opening of the spherical case, so that sounds concentrated by the mouth-piece enter the interior of the case and pass through the neck K and tube L to the ear with which the piece M is in contact.

Q is a concavo-convex diaphragm or shield having its concave side inward. There is an annular passage between the periphery of the shield Q and the inner end of the mouth-piece P to allow the entrance of sound whose escape through the mouth-piece is prevented to a great extent by the shield Q. The shield Q is secured to the case by a bracket-rod, R, or other means.

The flexible rod N may be wrapped or coated with non-conducting material, if desired.

We claim—

1. The combination of an electric battery, wires extending from the poles of the battery through a sound-conducting tube and connected to ear-pieces, and a mouth-piece in connection with the sound-conducting tube.

2. The combination of an electric battery, wires extending from the poles of the battery, a chamber with a receiving-mouth and a sound-conducting tube leading therefrom to an ear-piece in connection with one of the conducting-wires, and another ear-piece in connection with the other conducting-wire.

3. The combination of an electric battery, ear-pieces M and O in electric communication with its opposite poles, a case, I, and sound-conducting tube L, through which the wires extend, a mouth-piece, P, and shield or diaphragm, Q, substantially as set forth.

LYNN P. TOWNLEY.
WM. J. WASHBURN.

In presence of—
SAML. KNIGHT,
EDW. S. KNIGHT.